US010853029B2

(12) United States Patent
Michalowitz

(10) Patent No.: US 10,853,029 B2
(45) Date of Patent: *Dec. 1, 2020

(54) COMPUTERIZED SYSTEM INCLUDING RULES FOR A RENDERING SYSTEM ACCESSIBLE TO NON-LITERATE USERS VIA A TOUCH SCREEN

(71) Applicant: GOOGALE (2009) LTD., Cesaria (IL)

(72) Inventor: Nir Michalowitz, Cesaria (IL)

(73) Assignee: GOOGALE (2009) LTD., Cesaria (IL)

( * ) Notice: Subject to any disclaimer, the term of this patent is extended or adjusted under 35 U.S.C. 154(b) by 233 days.

This patent is subject to a terminal disclaimer.

(21) Appl. No.: 15/735,413

(22) PCT Filed: Jun. 16, 2016

(86) PCT No.: PCT/IL2016/050630
§ 371 (c)(1),
(2) Date: Dec. 11, 2017

(87) PCT Pub. No.: WO2016/203472
PCT Pub. Date: Dec. 22, 2016

(65) Prior Publication Data
US 2018/0136903 A1  May 17, 2018

Related U.S. Application Data

(60) Provisional application No. 62/181,328, filed on Jun. 18, 2015.

(51) Int. Cl.
*G06F 3/16* (2006.01)
*G06F 3/0488* (2013.01)
(Continued)

(52) U.S. Cl.
CPC .............. *G06F 3/167* (2013.01); *G06F 3/041* (2013.01); *G06F 3/0488* (2013.01);
(Continued)

(58) Field of Classification Search
CPC .......... G06F 3/0488; G06F 3/16; G06F 3/048; G06F 3/01; G06F 17/30; G06F 17/28;
(Continued)

(56) References Cited

U.S. PATENT DOCUMENTS 5,559,961 A     9/1996   Blonder
6,146,146 A *  11/2000   Koby-Olson ............ G09B 5/06
                                                            434/159

(Continued)

FOREIGN PATENT DOCUMENTS

WO      2004/111870 A1    12/2004
WO      2014/144908 A1     9/2014

OTHER PUBLICATIONS

Al-Khateeb et al. "Enhancing usability and security in click-based visual password systems." IADIS International Conference e-Society, 2010.

(Continued)

*Primary Examiner* — Quoc A Tran
(74) *Attorney, Agent, or Firm* — Oliff PLC

(57) ABSTRACT

Computerized system operative to perform selectable system-actions responsive to user input, the system being accessible to non-literate users via a touch screen defining touch screen locations respectively corresponding to the selectable system-actions, the touch screen being operative to detect and distinguish between first and second gestures, the system comprising a processor-controlled touch-triggered actor which, responsive to at least each first gesture applied by end-user to an individual location within the touch screen, from among plural touch screen locations, performs individual action/s which corresponds to the individual location; and a processor-controlled touch-triggered oral presenter which, responsive to at least each second gesture applied by end-user to an individual location within the touch screen, from among the plural touch screen (Continued)

locations, presents an oral characterization of individual action/s which corresponds to said individual location.

18 Claims, 5 Drawing Sheets

(51) Int. Cl.
| | |
|---|---|
| *G09B 19/00* | (2006.01) |
| *G09B 5/00* | (2006.01) |
| *G06F 3/041* | (2006.01) |
| *G06F 16/00* | (2019.01) |
| *G09B 5/04* | (2006.01) |
| *G09B 7/00* | (2006.01) |
| *G09B 3/00* | (2006.01) |
| *G09B 9/058* | (2006.01) |
| *G09B 5/06* | (2006.01) |
| *G06F 17/00* | (2019.01) |

(52) U.S. Cl.
CPC .......... *G06F 3/04883* (2013.01); *G06F 16/00* (2019.01); *G09B 5/00* (2013.01); *G09B 5/04* (2013.01); *G09B 19/00* (2013.01); *G09B 3/00* (2013.01); *G09B 5/06* (2013.01); *G09B 7/00* (2013.01); *G09B 9/058* (2013.01)

(58) Field of Classification Search
CPC .......... G06F 3/041; G06F 16/00; G06F 3/167; G06F 3/04883; G10L 15/22; G10L 15/00; G09B 9/058; G09B 91/325; G09B 3/00; G09B 5/06; G09B 5/04; G09B 7/00
See application file for complete search history.

(56) References Cited

U.S. PATENT DOCUMENTS

| | | | |
|---|---|---|---|
| 8,392,975 B1 | 3/2013 | Raghunath | |
| 8,554,835 B1 | 10/2013 | Williams | |
| 8,601,589 B2 | 12/2013 | Blagsvedt et al. | |
| 8,881,251 B1 | 11/2014 | Hilger | |
| 2003/0234824 A1 | 12/2003 | Litwiller | |
| 2005/0064375 A1* | 3/2005 | Blank | G09B 17/00 |
| | | | 434/178 |
| 2006/0085845 A1 | 4/2006 | Davis et al. | |
| 2006/0174339 A1 | 8/2006 | Tao | |
| 2006/0267276 A1 | 11/2006 | Farmer et al. | |
| 2006/0287030 A1 | 12/2006 | Briggs et al. | |
| 2007/0277224 A1 | 11/2007 | Osborn et al. | |
| 2009/0217342 A1 | 8/2009 | Nadler | |
| 2009/0254829 A1 | 10/2009 | Rohde | |
| 2010/0218663 A1 | 9/2010 | Choi | |
| 2011/0246888 A1* | 10/2011 | Drucker | G06F 1/1626 |
| | | | 715/716 |
| 2012/0167199 A1 | 6/2012 | Riddiford | |
| 2013/0047252 A1 | 2/2013 | Johnson et al. | |
| 2013/0268775 A1 | 10/2013 | Hawkins | |
| 2014/0025760 A1 | 1/2014 | Shore et al. | |
| 2015/0178490 A1 | 6/2015 | Tamboly et al. | |

OTHER PUBLICATIONS

Mhlanga. "Graphical Password Authentication for Secure Social Networks," 2013.
Radhika et al. "Compare Usability and Security of Graphical User Authentication Approaches." International Journal of Computer Science and Mobile Computing, Sep. 2014.
hittp://www.darkreading.com/vulnerabilities-and-threats/windows-8-picture-passwords-easily-cracked/d/d-id/1111351?; Sep. 28, 2013.
"PowerSchool Parent Portal User Guide;" Pearson; PowerSchol 7.x Student Information System; May 2012; 26 pp.
U.S. Appl. No. 15/735,399 filed Dec. 11, 2017 in the name of Michalowitz et al.
U.S. Appl. No. 15/837,656 filed Dec. 11, 2017 in the name of Michalowitz et al.

* cited by examiner

Fig. 1a

210: providing a touch screen defining a plurality of touch screen locations respectively corresponding to a plurality of selectable system-actions and operative to detect and distinguish between first and second gestures

220: providing an oral presentation library including a plurality of recorded oral presentations which when played to the end user by the oral presenter, orally characterize the plurality of actions respectively

230: providing a rules database storing at least one rule governing the behavior of at least one of the oral presenter and the actor, responsive to at least one sequence of end-user gestures including initial and subsequent end-user gestures; the rules database may store at least one premature-gesture-handling rule (e.g. for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B)

To step 240 of Fig. 1b

Fig. 1b

From step 230 of Fig. 1a

↓

240: providing a touch-triggered actor which, responsive to at least each first gesture applied by an end-user to an individual location within the touch screen, from among a plurality of touch screen locations, performs at least one individual action, from among the plurality of actions, which corresponds to the individual location

↓

250: providing a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location

↓

260: using touch screen and/or library and/or database and/or actor and/or oral presenter to interact with a pre-literate, non-literate or semi-literate end-user including providing oral information in a manner which well serves, and does not frustrate, the goals of the end-user e.g. child

FIG. 2 step 310: if an initial gesture is sensed at button A (e.g. of Fig. 4), oral presenter begins orally characterizing button A (5 sec sound file/ text/ image/ all may be data driven externally)

step 320: if a subsequent gesture is sensed by button B while the oral characterization of button A is still playing, oral presenter aborts oral characterization of button A and begins orally characterizing button B

step 330: if the initial gesture was a brief tap, begin performing the action corresponding to button A if the oral characterization of the button A terminates without interruption. If gesture was tap-hold, do not perform the action corresponding to button A

step 340: return to wait mode, go to step 310 when next gesture is sensed.

COMPUTERIZED SYSTEM INCLUDING RULES FOR A RENDERING SYSTEM ACCESSIBLE TO NON-LITERATE USERS VIA A TOUCH SCREEN

REFERENCE TO CO-PENDING APPLICATIONS

None.

FIELD OF THIS DISCLOSURE

The present invention relates generally to child-operated systems and more particularly to child-operated computerized systems.

BACKGROUND FOR THIS DISCLOSURE

The Googale.co.il website describes an enterprise providing computerized tools to licensed users, typically young children who may be pre-literate; the tools may be integrated with the children's studies in kindergarten and school and with the child's activities at home. The enterprise provides email, search engine, word is processor and electronic spreadsheet capabilities to young children.

Conventional mouse-operated systems display a characterization of a screen location if an end-user hovers over that location. For example, in Office, hovering over the Office button results in presentation of a text also known as a tooltip which verbally explains to the user that s/he can use this button to "see everything you can do . . . with your document". However, hovering is not a relevant concept in conventional touch-operated systems.

Conventionally, an event in which a user touches a touch-screen is classified, depending on the duration of contact (below or above certain threshold/s) between the user and the screen, as either a "tap" or a "tap-hold" (or "tap and hold") respectively.

However, since both classes of such events might also be termed "taps", the current specification classifies an event in which a user touches a touch-screen as a "brief tap" if the duration of contact between the user and the screen is short, and as a "tap-hold", if the duration of contact between the user and the screen is long.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Young children just learning or about to learn reading and writing cannot interact with Text based menus or with buttons identified by symbols and text.

Certain embodiments of the present invention seek to provide an educational interactive platform for use in educational facilities such as elementary schools, special education facilities, and kindergartens, with parental- or teacher-supervision of specific functionalities; the system shown and described herein may be provided in conjunction with a social network for children.

Certain embodiments seek to provide audio stimulus that enables a pre-literate child to hear a characterization of the functionality of (e.g. actions performable by) a button or other input option before s/he activates the button or otherwise interacts with the input option.

Typically, buttons interact with the child intuitively in a manner analogous to existing buttons in existing computerized applications intended for adults.

Certain embodiments seek to provide a non-alphanumeric user interface for non-literate or semi-literate users, enabling these users to perform conventional computerized activities such as searching, surfing and processing data.

Certain embodiments seek to provide a system whose user interface is particularly suited for pre-, non-, or semi-literate end users of a computerized typically touch-based system such as children either too young to read or with learning disabilities. The system typically performs actions including but not limited to the action of orally presenting another action. The system typically enables the non-literate end-users to perform functions and realize goals such as sending messages, handling contacts, searching, etc., using a child-behavior-based logic, e.g. searching for information by selecting from a hierarchical category tree, and/or responding to a popup offering to save/discard/continue an unsent mail while exiting.

There is thus provided, in accordance with an embodiment of the present invention, a computerized system operative to perform a plurality of selectable system-actions responsive to user input, the system being accessible to non-literate users via a touch screen defining a plurality of touch screen locations respectively corresponding to the plurality of selectable system-actions, the touch screen being operative to detect and distinguish between first and second gestures, the system comprising a processor-controlled touch-triggered actor which, responsive to at least each first gesture applied by an end-user to an individual location within the touch screen, from among a plurality of touch screen locations, performs at least one individual action, from among the plurality of actions, which corresponds to the individual location; and a processor-controlled touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location.

There is also provided, in accordance with an embodiment of the present invention, a computer program product, comprising a non-transitory tangible computer readable medium having computer readable program code embodied therein, the computer readable program code adapted to be executed to implement a computerized method operative to perform a plurality of selectable system-actions responsive to user input, the method being accessible to non-literate users via a touch screen defining a plurality of touch screen locations respectively corresponding to the plurality of selectable system-actions, the touch screen being operative to detect and distinguish between first and second gestures, the method comprising providing a processor-controlled touch-triggered actor which, responsive to at least each first gesture applied by an end-user to an individual location within the touch screen, from among a plurality of touch screen locations, performs at least one individual action, from among the plurality of actions, which corresponds to the individual location; and using a processor to control a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location.

There is further provided, in accordance with an embodiment of the present invention, a computerized method operative to perform a plurality of selectable system-actions responsive to user input, the method being accessible to non-literate users via a touch screen defining a plurality of touch screen locations respectively corresponding to the plurality of selectable system-actions, the touch screen being operative to detect and distinguish between first and second gestures, the method comprising providing a processor-controlled touch-triggered actor which, responsive to at least each first gesture applied by an end-user to an individual location within the touch screen, from among a plurality of touch screen locations, performs at least one individual action, from among the plurality of actions, which corresponds to the individual location; and using a processor to control a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location.

Also provided, excluding signals, is a computer program comprising computer program code means for performing any of the methods shown and described herein when the program is nm on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs: RAMs, ROMs, EPROMs, EEPROMs, magnetic or optical or other cards, for storing, and keyboard or mouse for accepting. Modules shown and described herein may include any one or combination or plurality of: a server, a data processor, a memory/ computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, is communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will he appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 1a-1b, taken together, form a simplified flowchart illustration of a method constructed and operative in accordance with an embodiment of the present invention.

FIG. 2 is a simplified flowchart illustration of a method constructed and operative in accordance with another embodiment of the present invention.

Figure 3:
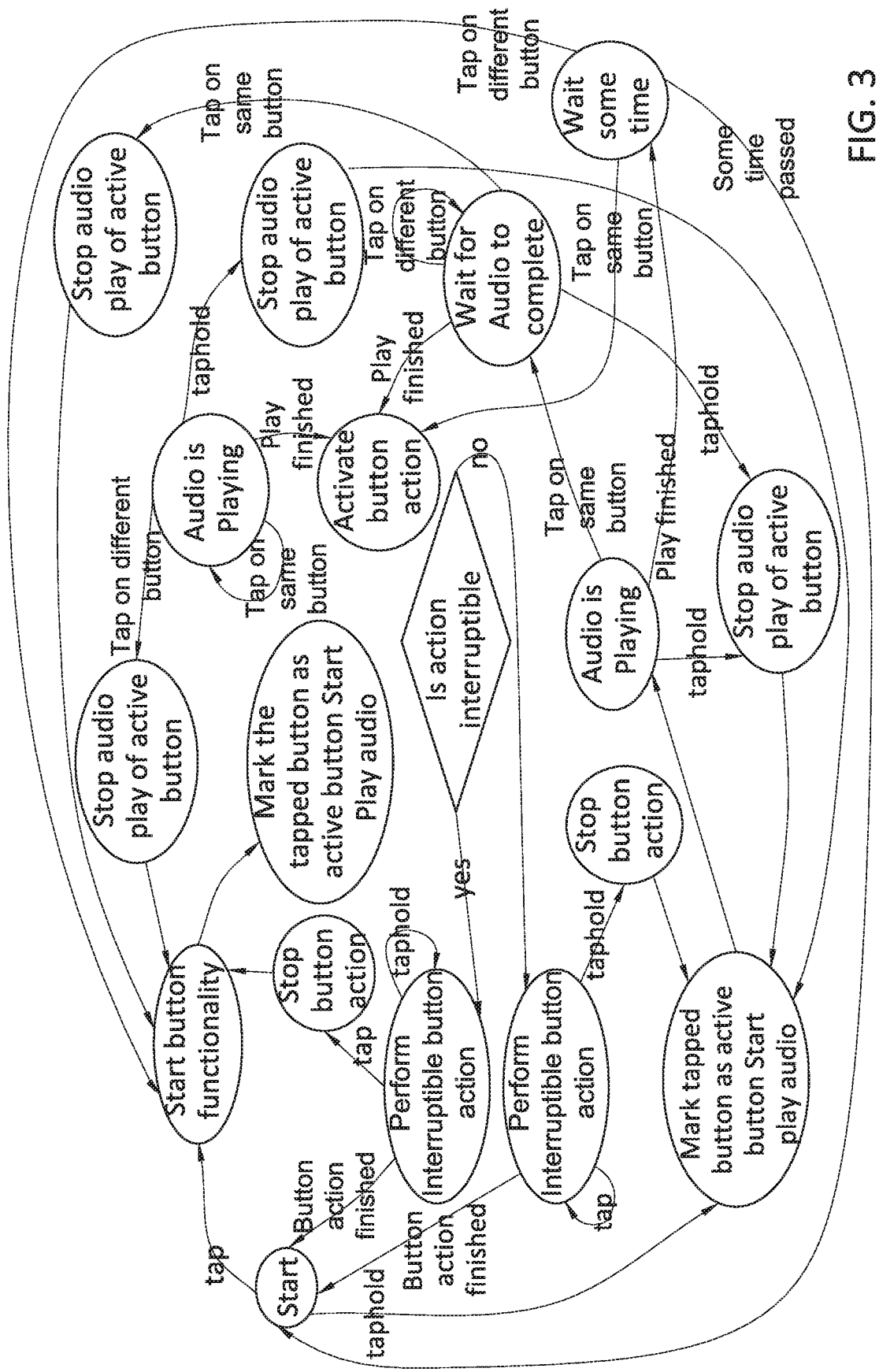
FIG. 3 is a simplified state chart representing logical rules, some or all of which may be provided in accordance with an embodiment of the present invention.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments of the present invention include a system including all or any subset of the following:

a. a touch-triggered actor operative to perform actions;

b. a touch screen or other device for sensing user interaction e.g. by touch;

c. an oral presenter e.g. audio speaker presenting an oral characterization of actions performed by the actor. For example, "let's watch a movie about turtles" might be orally presented to characterize (in a matter meaningful to, e.g. from the viewpoint of, the non-literate user) the action of loading and playing a movie about turtles accessible to the touch-trigger actor e.g. from a digital content repository;

d. a digital oral presentation library including a plurality of oral presentations for playing to the end user by the oral presenter, each being associated in computer memory with a plurality of actions performable by the actor, respectively;

e. a rules database or digital repository storing, in computer memory, at least one rule by which at least one associated processor may control or govern the behavior of at least one of the oral presenter and the actor; any suitable technology may be employed to store this logic since techniques for computer-storage of logic and rules are well known.

An action may include a very wide variety of computer system operations such as but not limited to: setting a mode of operation for component/s of the computer system (e.g. in a computer system comprising a mail editor—action might set the mail editor's mode of operation by setting font size font to either small medium or large), opening a popup window, load and display additional information (which may be logically subsumed under a first icon corresponding to a button) e.g. load and play a movie or load and display buttons (the buttons' icons may be logically subsumed under the first icon, e.g. first icon—birds; subsequently displayed buttons—pelican, flamingo, crow, owl); Send email message, Create new folder, Print a drawing, request assistance from teacher, select which application to operate (e.g. email/word processor/search); Save a bookmark; Select the eraser tool in order to start erasing objects from a drawing; respond to a poll e.g. with an answer from a menu or list of answers.

Actions may be implemented as a function having a pressed button object as a parameter which may for example determine what the action operates on. For example:

a. a button associated with a postage-stamp icon or symbol presented to the child end-user, may be associated with an action that opens a popup window displaying various postage stamps, one of which may be selected by a use.

b. a "Who should I write to" button may be associated with an action that opens a popup window with the address book.

c. In a children's computerized search engine which lets children virtually discover the world, each of various categories of information (animals, machines, countries, famous people) may be associated with a button to be pressed, which corresponds to the action of loading and displaying buttons corresponding to sub-categories of the original category. If the child selects "countries", the action might be loading and displaying buttons corresponding to the continents; if the child selects "North America" the action might be loading and displaying buttons corresponding to Canada, United States and Mexico, and so forth.

Touch UI that enables non readers to operate a button based system.

The term "button" as used herein is intended to include any object e.g. in the sense of object-oriented programming, that is presented to an end user of a computerized system e.g. has a visual presence on the screen. The term "button" as used herein may for example be a menu entry and is intended to include any graphical object such as but not limited to an Image or photograph, a geometric shape whether simple (e.g. rectangle/circle) or complex. A button may for example be implemented by using libraries such as JQuerey Mobile or Microsoft Silverlight or Microsoft Windows Presentation Foundation, e.g. by creating User Controls/Objects and tying the object's events; in some cases the raw (TouchDownEvent, TouchEnterEvent, TouchLeaveEvent, TouchMoveEvent, TouchUpEvent) may be wrapped with a control that will delay the trigger of the "tap hold" command after a timer, triggered during a tap down event, expires.

With the above extension, some or all of the following data may be stored for each Button object: Link to symbol e.g. URL, Button text (example string), Link to Voice file (if Audio played from file alternatively Text to speech library may be used to "speak" the text; Link to Action (e.g. linkt to function/method of object that performs the action for this button); Priority (e.g. int); Type (e.g. enum). Conventional state machine software tools may then be used, such as for example Microsoft's State Machine Workflows to build a state machine that implement desired rules e.g. any subset of or all of those shown and described herein, and to tie the events coming from the button objects to the machine as the machine events. The machine keeps the current button and with the event, gets as a parameter the object button that generated the event.

FIGS. 1a-1b, taken together, form a simplified generally self-explanatory flowchart illustration of an example method for serving non-literate users, according to certain embodiments; some or all of the following operations may be performed, suitably ordered e.g. as follows:

Operation 210: providing a touch screen defining a plurality of touch screen locations respectively corresponding to a plurality of selectable system-actions and operative to detect and distinguish between first and second gestures Operation 220: providing an oral presentation library including a plurality of recorded oral presentations which when played to the end user by the oral presenter, orally characterize the plurality of actions respectively.

Operation 230: providing a rules database storing at least one rule governing the behavior of at least one of the oral presenter and the actor, responsive to at least one sequence of end-user gestures including initial and subsequent end-user gestures; the rules database may store at least one premature-gesture-handling rule (e.g. for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B).

Operation 240: providing a touch-triggered actor which, responsive to at least each first gesture applied by an end-user to an individual location within the touch screen, from among a plurality of touch screen locations, performs at least one individual action, from among the plurality of actions, which corresponds to the individual location.

Operation 250: providing a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location. If the rules database stores a relevant premature-gesture-handling rule, the oral presenter's behavior may be governed by this rule e.g. responsive to situations in which (a) an end-user triggers a recorded oral presentation of an individual action A by applying a gesture to an individual location AA corresponding to action A and in which (b) subsequently, "prematurely" i.e. before the recorded oral presentation of individual action A has finished playing, the end-user applies a gesture to an individual location BB corresponding to action B.

Operation 260: using touch screen and/or library and/or database and/or actor and/or oral presenter to interact with a pre-literate, non-literate or semi-literate end-user including providing oral information in a manner which well serves, and does not frustrate, the goals of the end-user e.g. child e.g. as described in detail herein. For example, suitable rule based logic may be employed to govern the system's behavior as appropriate given that a child may have pressed a button by accident, and/or to control the system to refrain from performing the same action over and over again although a child may have made a gesture corresponding to that action a number of times; instead the system might infer what the child really wants. For example, if the child's repeated gestures each are intended to invoke an oral presentation of an action, the system might infer after several such repetitions that what the child really wants is for the system to actually perform the action; the system would typically not orally present the action again and again and might instead simply perform the action. Many other examples of rules for serving rather than frustrating the goals of the non-literate end-user who e.g. as above may not be correctly using the user interface so as to correctly express and implement her or his goals, are described herein. Rules may be determined in a set-up stage in which a child's natural interaction with the system is observed and compared to the child's actual goals as expressed when debriefed by a human observer or as expressed in her or his subsequent behavior.

It is appreciated that certain actions, e.g. play a video or audio clip, may take a relatively long time to complete and rules may then be employed to best serve the child e.g. if the child performs various gestures while the clip is playing; the rules might determine whether to continue playing the clip or whether to interrupt or terminate the clip, depending e.g. on a predetermined priority of the action (e.g. "play clip") corresponding to the first of the child's gestures. If the action corresponding to the child's first gesture is deemed important, the system might continue playing the clip, whereas if the action corresponding to the child's first gesture is deemed unimportant, the system might interrupt or terminate playing the clip once the child makes her or his next gesture.

These rules are particularly important for audio actions. For example, the rules database may be used to store audio prioritizing rules which determine how to prioritize a first audio stimulus being presented to the child via an initial gesture (e.g. an audio clip or a brief oral characterization of an action) relative to a second audio stimulus that the child is now requesting via a subsequent gesture made while the first audio stimulus is still being presented. For example, the system is playing video including sound and rule/s in the rules data repository (database) may he used to determine whether or not, responsive to tapping or tapholding during the video, the system should "speak" (orally present) a just-tapped button.

For example, the system may comprise (embodiment 1) a touch-triggered actor which, responsive to each, or at least each, first gesture applied by an end-user to an individual location within the touch screen, from among a plurality of touch screen locations, performs a specific action, from among the plurality of actions, which corresponds to the individual location; and a touch-triggered oral presenter which, responsive to each, or at least each, second gesture applied by an end-user to an individual location within the touch screen, from among the plurality of touch screen locations, presents an oral characterization of the specific action, from among the plurality of actions, which corresponds to the individual location.

It is appreciated that there need not be a one-to-one correspondence between actions and locations; the same action may be invoked for 2 different locations for example. Similarly, there need not be a one-to-one correspondence between actions and gestures; more than one action might be performed responsive to a single gesture and/or several gestures might correspond to a single action.

According to certain embodiments, the child typically applies a gesture to one of, thereby choosing between, a plurality of locations, bearing icons reminiscent of email, search engine, and spreadsheet functionality respectively. The child's gesture may trigger the actor to cause the system to change into email mode, search engine mode, and spreadsheet mode, respectively. Oral characterizations of each of these mode-changing actions may for example be "email" "let's find out" and "let's work it all out", respectively.

To give another example, once the system is in search mode, the child typically applies a gesture to one of, thereby choosing between, a plurality of locations, thereby to cause the actor to present one of a plurality of information repositories. For example, a gesture applied to one location, bearing an elephant icon, may trigger the actor to present information about animals, whereas the same gesture applied to another location, bearing a daisy icon, may trigger the actor to present information about flowers. Oral characterizations of each of these information presentation actions may for example be "Tell me about animals", "tell me about flowers", etc.

To give another example, once the system is in the animal-sub-mode of a search mode, several icons (touch screen locations) may be provided such as "what does it eat?" "what does it look like?" "what does it sound like?". Responsive to the first and third, suitable audio information may be played, responsive to the second, a suitable video clip may be played, and so forth.

A particular advantage of certain embodiments, is that a non-literate child can graduate easily from the system according to certain embodiments, to a conventional computerized system intended for use by literate end-users. For example, a non-literate version of a conventional computerized system intended for use by literate end-users may be developed by using the gesture which triggers actions in the "literate" version of the system used as the first gesture in the "non-literate" version of the system. Therefore, when the child graduates from the "non-literate" to the conventional, "literate" version, the child easily adapts, since the first gesture continues to trigger the same actions when applied to suitable respective locations, hence the difference between the non-literate and literate version may merely be whether or not there is an option of applying the second gesture so as to obtain oral presentations of actions.

Another advantage of certain embodiments, is that an "audio tool-tip" may be provided. A non-literate child can be presented with audio descriptions of action options, even though the input device mode—touch—does not facilitate this, since contrary to other input device modes, there may be no hovering capacity e.g. no mouse-in or mouse-out events to inform the system of what screen location the end-user might be about to select.

Another advantage of certain embodiments, is that a child can explore various touch screen locations e.g. "buttons", each of which, if selected, results in a particular action being performed by the touch-triggered actor at the child's behest, despite the fact that (a) the child is using a touch screen with all the disadvantages that entail relative to a mouse; and/or (b) the child is pre-literate and/or (c) the child is working independently with no guidance from a literate supervisor. In many conventional computer systems, no user-interface technology is provided that might enable the pre-literate child to learn usage by experience/trial and error; instead the assumption is that a literate supervisor (or software equivalent) is present; s/he normally would simply direct the child to perform a supervisor-imposed sequence of operations that are "right". It is appreciated that the actions performed by the touch-triggered actor e.g. at the child's behest, may include any system action, data-driven or otherwise, which the system/actor is configured e.g. programmed to perform, including, but of course not limited to, the system action of presenting e.g. displaying certain information; or the system action of setting or changing an operational mode (e.g. insert mode vs. override mode) within which the system is operating. For example, certain embodiments shown and described herein enable a non-literate child using a touchscreen to independently, with no literate supervision whatsoever, browse between icons pictorially representing categories of information, and to encounter information in any of those categories, once the system presents same responsive to the child's selection of any of the icons. The icons need not perfectly represent the respective categories of information since the icon's representation of the categories may be augmented by an oral presentation of the information "residing below" a particular icon.

The applicability of certain embodiments is not limited to pure touch applications; and instead includes use-cases where both mouse and touch interactions with the end-user are possible.

The applicability of certain embodiments includes use-cases in which hierarchies of system actions are provided i.e. certain actions become options only after other actions such as "display menu") have previously been selected and performed.

It is appreciated that any suitable touch screen may be employed, e.g. any display for computer-generated or stored data that is also an input device, such as a screen or other display that is sensitive to pressure; or such as any system which senses a user interacting therewith by touching pictures or words or other locations on or in a display. The touch screen may for example be based on resistive, surface wave or capacitive technology. It is appreciated that the touch screen may include a virtual touch screen (VTS) e.g. a user interface system that augments virtual objects into reality e.g. via a projector or optical display, and may use sensors to track a user's visual and/or physical interaction with projected virtual object/s.

Referring again e.g. to embodiment 1, it is appreciated that many variations on this embodiment are possible, such as but not limited to:

Embodiment 2. A system according to any preceding embodiment and also comprising an oral presentation library including a plurality of recorded oral presentations in a computer-implemented memory which, when played to the end user by the oral presenter, orally characterize the plurality of actions respectively.

Embodiment 3. A system according to any preceding embodiment wherein the oral presenter also presents an oral characterization of the individual action, from among the plurality of actions, which corresponds to the individual location, responsive to each first gesture applied by an end-user to the individual location within the touch screen.

Embodiment 4. A system according to any preceding embodiment and also comprising a rules database storing, in a computer-implemented memory, at least one rule governing the behavior of at least one of the oral presenter and the actor, responsive to at least one sequence of end-user gestures including initial and subsequent end-user gestures.

Embodiment 5. A system according to any preceding embodiment wherein the rules database stores at least one premature-gesture-handling rule governing the oral presenter's behavior responsive to situations in which an end-user triggers a recorded oral presentation of an individual action A by applying a gesture to an individual location AA corresponding to action A and subsequently, "prematurely" i.e. before the recorded oral presentation of individual action A has finished playing, the end-user applies a gesture to an individual location BB corresponding to action B.

Example rules, all or any subset of which may be provided, are shown in the state chart of FIG. 3.

Embodiment 6. A system according to any preceding embodiment wherein least one premature-gesture-handling rule is operative for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B.

For example, the following rule may be used by the system: If only a few seconds have elapsed between 2 taps on the same button, the system may assume that the child, having heard the oral presentation of Action A responsive to her first tap, now wants to perform Action A (e.g., to play a video clip). Therefore, responsive to the second tap, the system actor performs Action A and, as opposed to when responding to the first tap, the oral presenter does not re-present Action A orally. In contrast, if more than a few seconds elapse between the same 2 taps, the system may no longer assume that the child wants to select Action A, and therefore, the oral presenter presents Action A twice, once responsive to the first tap and again responsive to the second tap.

Embodiment 7. A system according to any preceding embodiment wherein the rules database stores at least one immediately-subsequent-gesture-handling rule governing the behavior, of at least one of the oral presenter and the actor, responsive to situations in which an end-user applies a subsequent gesture "immediately" after i.e. within a pre-determined time window after an initial gesture.

Embodiment 8. A system according to any preceding embodiment and wherein the actions are each assigned one of at least 2 levels of priority and wherein the rules database stores rules governing behavior of at least one of the oral presenter and the actor responsive to at least one sequence of end-user gestures including initial and subsequent end-user gestures and wherein one of the rules is selected for application depending at least partly on a level of priority of the action corresponding to the initial end-user gesture.

For example, actions may each be assigned a level of priority such as some or all of the following: interruptible, non-interruptible, non-abortable. For example:

a. if the user used a brief tap to activate a video clip and is defined as "non-interruptible", and the user now tap-holds another button on the touch screen while the video clip is still playing, the video clip will not be interrupted; instead the tap-hold action will be ignored. In contrast, if the video clip is deemed lower priority, and is hence defined as "interruptible, the subsequent tap-hold action will be responded to. According to certain embodiments, video clips presented to the user pursuant to a user's search for results are deemed non-interruptible by tap-holds and interruptible by brief taps. Therefore, if a user tap-holds while a previously selected video clip is still playing, the system will not respond. However, if the user brief-taps while the previously selected video clip is still playing, the video clip will abort and the system will respond to the brief tap.

b. If the user initiated a search and at least one search result was presented to her or him, the system may subsequently ask the user whether or not the search results were what s/he was looking for. The state of waiting for the user's response to this typically orally presented question, may be defined as non-abortable hence high priority, in which case all subsequent user actions may be ignored until the user responds to the query.

Embodiment 9. A system according to any preceding embodiment wherein the first gesture comprises a brief tap.

Embodiment 10. A system according to any preceding embodiment wherein the second gesture comprises a tap-hold.

It is appreciated that tap and tap-hold are but examples of conventional gestures e.g. in JQuerey Mobile which is but one possible library that may be used for implementing the underlying infrastructure including using the JQuerey (or other library's) events to trigger the state machine of the button.

Any other pair of gestures may replace the tap and tap hold gestures/events described herein. According to certain embodiments, a child version of a conventional application may use the same gestures as the conventional (adult-oriented) application for some or all Actions and another gesture may be defined to elicit the voice tooltip for that action, thereby to render the child-oriented version of the application both "compatible" to the conventional adult version and intuitive.

Alternatively, then, the roles might be reversed (first gesture—tap-hold; second gesture—brief tap); or the first or second gestures might be any other suitable gesture such as but not limited to pinch, press and tap, flick, swipe, spread, double-tap, rotate, or directional or other variations on the same type of gesture e.g. the first/second gestures might be an upward/downward flick respectively, or vice versa.

In certain embodiments, when an end-user tap-holds a location corresponding to action x, the system plays a recording describing action x but does not perform action x. When the end-user briefly taps the location corresponding to action x, the system (optionally plays the recording describing action x and also) performs action x.

Embodiment 11. A system according to any preceding embodiment and also comprising a touch screen operative to detect, and distinguish between, the first and second gestures.

Embodiment 12. A system according to any preceding embodiment and also comprising a tablet having a touch screen operative to detect, and distinguish between, the first and second gestures.

Embodiment 13. A system according to any preceding embodiment wherein the levels of priority determine whether or not an action of at least one of the oral presenter and the actor, initiated responsive to the initial end-user gesture, is interruptible if the action interferes with another action which is to be initiated responsive to the subsequent end-user gesture. For example, if a video clip, located "below" a particular touch location or button, is in the middle of playing (first action) and another video clip is to be played responsive to a subsequent gesture the child has made, these 2 actions interfere with one another because the already playing video makes it impractical to simultaneously play a new video since the child cannot hear both. Therefore, if the priority of the first action is "interruptible", the actor may interrupt or terminate playing the first video and may initiate playing of the second video.

Other embodiments, implementations and variations are now described.

Suitable rules may be stored e.g. in the rules database/repository to ensure desired talking-button behaviors, responsive to user gesture patterns such as gestures (applied to same or different touch screen locations) immediately following one another e.g. within a predetermined time window and/or while an audio message triggered by a previous gesture, is still playing.

For example, some or all of the following "immediately subsequent-gesture handling" rules or rule components may be provided:

a. Normally, if button1 is brief-lapped, its audio is played and subsequently, its action is activated.

However, if responsive to brief-tapping, the Audio of a button1 is being played and has not finished playing when a new brief-tap, on Button2, is sensed—the Playing audio of button1 may be stopped and button1's action may not be activated instead, Button2 functionality starts.

b. If button1's activity is defined as interruptible and Button 1's activity has still not terminated when a new brief-tap, on Button2, is sensed—button 1's activity is stopped and then Button 2's functionality starts.

If this button audio is being played ignore tap c. talking button1's oral presenter plays the. Audio of button1 responsive to a gestures sensed by button1—unless the same audio was played recently (parameter)). when the play finishes (if played i.e. If the audio has not been played recently), button1's actor activates the action corresponding to the button—also termed the "button activity"

d. when TapHold is sensed by button1, If another button, button2, has an active (not yet finished) button activity, ignore taphold e. if an Audio of button1 (this or other) is being played and did not finish play until a tap is sensed on button2 (or until an additional tap is sensed on button1), the Playing audio of button 1 is stopped. Instead, Talking button2's oral presenter plays its Audio.

FIG. 2 is a simplified flowchart illustration of an example method of operation, using touch screen logic provided according to certain embodiments; some or all of the following operations may be performed, suitably ordered e.g. as shown:

step 310: if an initial gesture is sensed at button A (e.g. of FIG. 4), oral presenter begins orally characterizing button A (5 sec sound file/text/image/all may be data driven externally)

step 320: if a subsequent gesture is sensed by button B while the oral characterization of button A is still playing, oral presenter aborts oral characterization of button A and begins orally characterizing button B step 330: if the initial gesture was a brief tap, begin performing the action corresponding to button A if the oral characterization of the button A terminates without interruption. If gesture was tap-hold, do not perform the action corresponding to button A step 340: return to wait mode, go to step 310 when next gesture is sensed.

Certain embodiments seek to provide smooth and intuitive operation also on machines that support concurrent touch and mouse interactions with end-users. The Talking button may have 2 modes (mouse, touch e.g.) of responding to users. For example, Button Audio may be activated by alternate methods including, for example, mouse hover.

It is appreciated that certain embodiments of the invention are suitable for designing a Touch user interface or other user-responsive device that enables non readers to operate any suitable computerized system such as, but not limited to, a button based system, as in the above example, or a menu-driven system.

A Rule database may be represented as a state machine e.g. as illustrated in self-explanatory FIG. 3 which is a diagram of an example state machine; obviously some or all of the states shown may be provided; and transitions from state to state may be "mixed and matched" to generate rule patterns other than those specifically illustrated in FIG. 3 or elsewhere herein.

Figure 4:
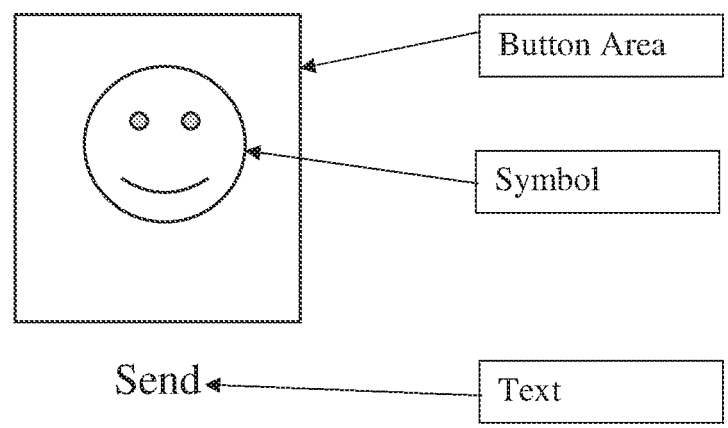
FIG. 4 is a simplified pictorial representation useful in appreciating an embodiment of the present invention.

According to certain embodiments, "Talking buttons" are deployed on a touch screen; these may operate together. FIG. 4 is a simplified pictorial illustration of a talking button according to certain embodiments.

Each talking button may include some or all of the following components or objects:

a. ButtonArea—An Area e.g. touch screen location that responds to e.g. senses end-user gestures such as but not limited to any or all of: Click/Tap/Mouse over (in and out) events b. Symbol—e.g. an icon, such as the Smiley in FIG. 4, that usually appears inside the button area.

c. Actor/Action—the action which is performed or activated when the button is selected using a predetermined gesture sensed by the button area e.g. the button area may be briefly tapped or played d. Text—text visually displayed (e.g. for semi-literate children) adjacent the buttonArea that describes the action which will be performed or activated when the button is tapped or played e.g. using a predetermined gesture sensed by the button area e. oral presenter/Audio—a Sound e.g. voice message that is played in order to describe or orally characterize the action (c.) e.g. responsive to a predetermined gesture which differs from the gesture that triggers action c.—such as tap-hold A Talking button may have a tooltip.

A Talking button may have a disabled indication. For example a "Coming soon" note may appear on a disabled button.

It is appreciated that terminology such as "mandatory", "required", "need" and "must" refer to implementation choices made within the context of a particular implementation or application described herewithin for clarity and are not intended to be limiting since in an alternative implantation, the same elements might he defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter ilia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described, or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A computerized system operative to perform a plurality of selectable system-actions responsive to user input, the system being accessible to non-literate users via a touch screen defining a plurality of touch screen locations respectively corresponding to the plurality of selectable system-actions, the touch screen being operative to detect and distinguish between first and second gestures, the system comprising:
a processor-controlled touch-triggered actor which, responsive to at least each first gesture applied by an end-user to an individual location within the touch screen, from among a plurality of touch screen locations, performs at least one individual action, from among said plurality of actions, which corresponds to said individual location; and
a processor-controlled touch-triggered oral presenter which, responsive to at least each second gesture applied by an end-user to an individual location within the touch screen, from among the plurality of touch screen locations, presents an oral characterization of the at least one individual action, from among said plurality of actions, which corresponds to said individual location,
the system being operative in conjunction with a touch screen operative to detect and distinguish between the first and second gestures, wherein a plurality of selectable system-actions responsive to user input are performed and wherein the touch screen defines a plurality of touch screen locations respectively corresponding to the plurality of selectable system-actions.

2. A system according to claim 1 wherein the oral presenter also presents an oral characterization of the individual action, from among said plurality of actions, which corresponds to said individual location, responsive to each first gesture applied by an end-user to the individual location within the touch screen.

3. A system according to claim 1 wherein said first gesture comprises a brief tap.

4. A system according to claim 1 wherein said second gesture comprises a tap-hold.

5. A system according to claim 1 and also comprising a touch screen operative to detect, and distinguish between, the first and second gestures.

6. A system according to claim 1 and also comprising a tablet having a touch screen operative to detect, and distinguish between, the first and second gestures.

7. A system according to claim 1, further comprising a touch screen operative to detect and distinguish between the first and second gestures, and wherein the touch screen defines a plurality of touch screen locations respectively corresponding to the plurality of selectable system-actions.

8. A computer program product, comprising a non-transitory tangible computer readable medium having computer readable program code embodied therein, said computer readable program code adapted to be executed to implement a computerized method operative to perform a plurality of selectable system-actions responsive to user input, the method being accessible to non-literate users via a touch screen defining a plurality of touch screen locations respectively corresponding to the plurality of selectable system-actions, the touch screen being operative to detect and distinguish between first and second gestures, the method comprising:
providing a processor-controlled touch-triggered actor which, responsive to at least each first gesture applied by an end-user to an individual location within the touch screen, from among a plurality of touch screen locations, performs at least one individual action, from among said plurality of actions, which corresponds to said individual location; and
using a processor to control a touch-triggered oral presenter which, responsive to at least each second gesture applied by an end-user to an individual location within the touch screen, from among the plurality of touch screen locations, presents an oral characterization of the at least one individual action, from among said plurality of actions, which corresponds to said individual location,
the method further comprising providing an oral presentation library including a plurality of recorded oral presentations in a computer-implemented memory which, when played to the end user by the oral presenter, orally characterize the plurality of actions respectively,
the method further comprising a rules database storing, in a computer-implemented memory, at least one rule governing the behavior of at least one of the oral presenter and the actor, responsive to at least one sequence of end-user gestures including initial and subsequent end-user gestures.

9. A computer program product according to claim 8 wherein the rules database stores at least one premature-gesture-handling rule governing the oral presenter's behavior responsive to situations in which an end-user triggers a recorded oral presentation of an individual action A by applying a gesture to an individual location AA corresponding to action A and subsequently, before the recorded oral presentation of individual action A has finished playing, the end-user applies a gesture to an individual location BB corresponding to action B.

10. A system according to claim 9 wherein least one premature-gesture-handling rule is operative for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B.

11. A computer program product according to claim 8 wherein the rules database stores at least one immediately-subsequent-gesture-handling rule governing the behavior, of at least one of the oral presenter and the actor, responsive to situations in which an end-user applies a subsequent gesture within a predetermined time window after an initial gesture.

12. A computer program product according to claim 8 and wherein said actions are each assigned one of at least 2 levels of priority and wherein the rules database stores rules governing behavior of at least one of the oral presenter and the actor responsive to at least one sequence of end-user gestures including initial and subsequent end-user gestures and wherein one of the rules is selected for application depending at least partly on a level of priority of the action corresponding to the initial end-user gesture.

13. A system according to claim 8 wherein said levels of priority determine whether or not an action of at least one of the oral presenter and the actor, initiated responsive to the initial end-user gesture, is interruptible if the action interferes with another action which is to be initiated responsive to the subsequent end-user gesture.

14. A product according to claim 8 wherein the method also comprises performing the plurality of selectable system-actions responsive to user input, and providing a touch screen defining a plurality of touch screen locations respectively corresponding to the plurality of selectable system-actions, the touch screen being operative to detect and distinguish between the first and second gestures.

15. A computerized method operative to perform a plurality of selectable system-actions responsive to user input, the method being accessible to non-literate users via a touch screen defining a plurality of touch screen locations respectively corresponding to the plurality of selectable system-actions, the touch screen being operative to detect and distinguish between first and second gestures, the method comprising:
  providing a processor-controlled touch-triggered actor which, responsive to at least each first gesture applied by an end-user to an individual location within the touch screen, from among a plurality of touch screen locations, performs at least one individual action, from among said plurality of actions, which corresponds to said individual location; and
  using a processor to control a touch-triggered oral presenter which, responsive to at least each second gesture applied by an end-user to an individual location within the touch screen, from among the plurality of touch screen locations, presents an oral characterization of the at least one individual action, from among said plurality of actions, which corresponds to said individual location,
  the method being operative in conjunction with a touch screen which defines a plurality of touch screen locations and which is operative to detect and distinguish between the first and second gestures, and wherein a plurality of selectable system-actions responsive to user input are performed and wherein the plurality of selectable system-actions respectively correspond to said plurality of touch screen locations.

16. A method according to claim 15 wherein the method also comprises performing the plurality of selectable system-actions responsive to user input, and providing a touch screen defining a plurality of touch screen locations respectively corresponding to the plurality of selectable system-actions, the touch screen being operative to detect and distinguish between the first and second gestures.

17. A method according to claim 15 wherein the oral presenter also presents an oral characterization of the individual action, from among said plurality of actions, which corresponds to said individual location, responsive to each first gesture applied by an end-user to the individual location within the touch screen.

18. A method according to claim 15, further comprising the touch screen operative to detect and distinguish between the first and second gestures, and wherein the touch screen defines a plurality of touch screen locations respectively corresponding to the plurality of selectable system-actions.

\* \* \* \* \*